3,535,047
TEETH CLEANING DEVICE
Lawrence O. Vireno, 139 Kinross Drive,
San Rafael, Calif. 94901
Filed Dec. 27, 1967, Ser. No. 693,846
Int. Cl. A46b *11/06*
U.S. Cl. 401—10      2 Claims

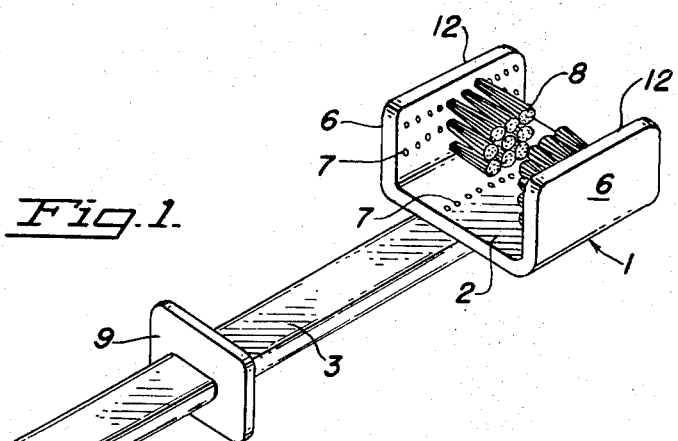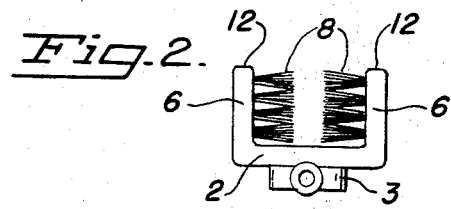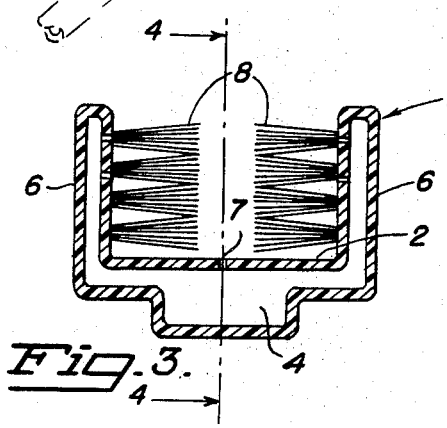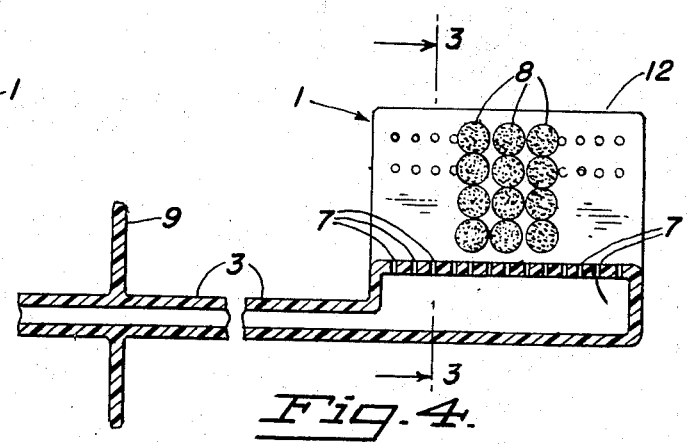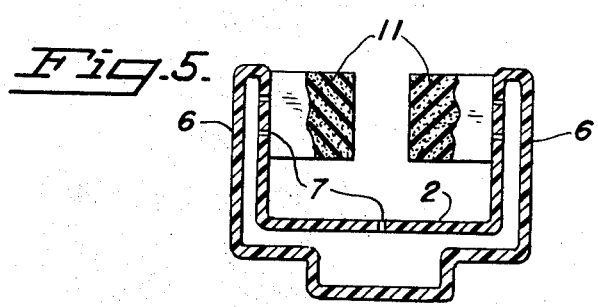

ABSTRACT OF THE DISCLOSURE

A generally U-shaped hollow body with perforations on the opposite sides of the U-shaped body and also in the bottom which function as spray nozzles to direct jets of fluid on the teeth and gums which are straddled by the U-shaped body; a massaging or scrubbing element such as opposite spaced soft bristles or sponge rubber or the like is provided on the sides of the U-shaped body for scrubbing and massaging the teeth and gums; a hollow handle extends from the bottom of the U-shaped body, to be connected by suitable tube or hose to a faucet or the like; and a water guard is provided on the handle to prevent the water from dripping down on the hand and arm of the user.

BRIEF DESCRIPTION OF THE INVENTION

The main object of the invention is to provide a spraying and scrubbing device which straddles a certain number of teeth so as to direct jets of water or liquid upon the teeth and also to contact the inside and outside of the teeth for scrubbing and massaging; the device is made of generally U-shaped cross-section and hollow and of such length that it can straddle a number of teeth and can be inverted from the lower teeth to the upper teeth and shifted along the teeth yet the soft brushes or sponge rubber or the like may still remain in contact with the inside and outside of the teeth and gums.

DESCRIPTION OF FIGURES

FIG. 1 is a perspective view of the teeth cleaning device on an enlarged scale.

FIG. 2 is an end view of the device.

FIG. 3 is a sectional view, a section being taken on lines 3—3 of FIG. 4.

FIG. 4 is a sectional view of section being taken on lines 4—4 of FIG. 3.

FIG. 5 is a device showing the sponge rubber in place of brushes on an enlarged scale.

DETAILED DESCRIPTION

The device includes a hollow body 1 of U-shaped cross-section, the connecting portion or bottom 2 of which has a hollow handle 3 thereon for conducting water or other liquid into the hollow space 4 of the body 1. The sides 6 of the U-shaped body have, as well as the bottom 2, on their respective inside walls, a plurality of nozzle perforations 7 for directing jets of liquid on the teeth and gums. In the middle of each side 6, and from its inner wall, extends a scrubbing and massaging element such as soft bristled brushes 8. The brushes 8 are spaced from one another and are made of soft bristles so as to readily conform to the contours of the teeth straddled by the device.

A water guard in the form of an obstructing flange 9 is provided all around the handle 3, suitably spaced from the U-shaped body 1 to prevent the water from running down the handle 3 on to the hand of the user.

As shown in FIG. 5, in place of the soft bristles 8, sponge rubber 11 may be utilized.

The optimum dimensions for the straddle so as to contact several teeth yet not to bruise the gums, are as follows:

The distance between the outer walls of the sides 6, about 27 millimeters (mm.). The space between the inner walls of the sides 6, 21 mm. The length of the brushes 8 mm., leaving a space of 5 mm. between the brushes, which should take care of both the back teeth and the front teeth. The height of the side 6, between 16 and 19 mm.; the height of the inner walls of the side 6, about 13 mm. There are two rows of perforations of the inner wall of each side 6. One row of perforations 7 are 3 mm. from the free edge 12 of each side 6 and the second row of perforations 7 are spaced 3 mm. from the first row toward the bottom 2. The perforations on the bottom 2 are equidistant from the inner walls of the side 6. The handle 3 is preferably flat so as to facilitate the holding of the U-shaped body in proper straddling position over the teeth.

In use the cleaning device herein described can be easily inverted from the lower teeth to the upper teeth and vice versa. By reason of its dimensions it can reach between the teeth at the corner of the mouth and perform thorough cleaning of the teeth and massaging of the gums.

I claim:
1. A teeth cleaning and massaging device comprising
   (a) a hollow body,
   (b) a flat hollow bottom on said body,
   (c) a hollow side extending from each of opposite edges of said bottom,
   (d) the other edges of said bottom remaining unobstructed,
   (e) the interior of said bottom and said sides being in contiguous communication,
   (f) a hollow handle extended from one of the unobstructed edges of said hollow bottom and in the same plane as said hollow bottom and being adapted to conduct liquid into said hollow bottom,
   (g) said sides and said bottom having nozzle perforations directing jets of liquid inwardly of the U-shaped space defined by said sides and said bottom,
   (h) massaging means extended from each of said sides toward the other and adapted to conform to the contour of the teeth straddled by said U-shaped space defined by said sides and bottom,
   (i) said massaging means being only on a middle portion of each inner wall of each side, leaving exposed the perforations on the remaining portions of each inner wall.
2. The invention defined in claim 1 and said sides being about 16 mm. in height at their outer walls, with about 13 mm. high inner walls, and the inner walls being spaced from each other at about 21 mm., the total height of the body being about 19 mm. thereby to adapt the same to straddle a number of teeth without discomfort to the user.

References Cited

UNITED STATES PATENTS

| | | | |
|---|---|---|---|
| 428,140 | 5/1890 | Rich | 401—288 |
| 1,189,505 | 2/1916 | Stockton | 401—10 |
| 2,773,276 | 12/1956 | Pape | 401—10 |
| 3,109,192 | 11/1963 | Levenson | 401—10 X |
| 3,211,149 | 10/1965 | Fono | 128—66 |

HARLAND S. SKOGQUIST, Primary Examiner

U.S. Cl. X.R.

401—28, 287